United States Patent
Goettsch et al.

(10) Patent No.: US 9,505,286 B2
(45) Date of Patent: Nov. 29, 2016

(54) METHOD AND DEVICE FOR PREVENTING THE LATERAL ROLLOVER OF MOTOR VEHICLE

(75) Inventors: Gerhard Goettsch, Heilbronn (DE); Dominik Merlein, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 1158 days.

(21) Appl. No.: 13/056,950

(22) PCT Filed: Jul. 9, 2009

(86) PCT No.: PCT/EP2009/058719
§ 371 (c)(1),
(2), (4) Date: Apr. 15, 2011

(87) PCT Pub. No.: WO2010/023019
PCT Pub. Date: Mar. 4, 2010

(65) Prior Publication Data
US 2011/0190976 A1    Aug. 4, 2011

(30) Foreign Application Priority Data
Aug. 27, 2008 (DE) .......................... 10 2008 041 586

(51) Int. Cl.
| | | |
|---|---|---|
| B60G 17/00 | (2006.01) | |
| B60G 17/016 | (2006.01) | |
| B60G 17/018 | (2006.01) | |
| B60G 17/0195 | (2006.01) | |

(52) U.S. Cl.
CPC ....... *B60G 17/0162* (2013.01); *B60G 17/0195* (2013.01); *B60G 2400/0511* (2013.01); *B60G 2400/0521* (2013.01); *B60G 2400/104* (2013.01); *B60G 2400/61* (2013.01)

(58) Field of Classification Search
None
See application file for complete search history.

(56) References Cited

U.S. PATENT DOCUMENTS

| | | | |
|---|---|---|---|
| 3,908,782 A | | 9/1975 | Lang et al. |
| 6,130,608 A | | 10/2000 | McKeown et al. |
| 6,152,252 A | * | 11/2000 | Pettersson ..................... 180/282 |
| 6,438,463 B1 | * | 8/2002 | Tobaru et al. .................... 701/1 |
| 6,554,293 B1 | * | 4/2003 | Fennel et al. .............. 280/5.502 |
| 7,502,675 B2 | * | 3/2009 | Hac et al. ........................ 701/38 |
| 8,014,922 B2 | * | 9/2011 | Le et al. ......................... 701/45 |
| 8,050,857 B2 | * | 11/2011 | Lu et al. ....................... 701/124 |
| 8,219,282 B2 | * | 7/2012 | Lu et al. ......................... 701/36 |
| 2004/0254707 A1 | * | 12/2004 | Lu et al. ......................... 701/70 |
| 2005/0080543 A1 | * | 4/2005 | Lu et al. ......................... 701/70 |
| 2006/0076741 A1 | * | 4/2006 | Lim ........................... 280/5.508 |
| 2006/0085112 A1 | * | 4/2006 | Lu et al. ......................... 701/38 |

(Continued)

FOREIGN PATENT DOCUMENTS

| | | |
|---|---|---|
| CN | 1736744 | 2/2006 |
| DE | 103 56 827 | 7/2005 |

(Continued)

*Primary Examiner* — Fadey Jabr
*Assistant Examiner* — Kevin P Mahne
(74) *Attorney, Agent, or Firm* — Norton Rose Fulbright US LLP; Gerard Messina

(57) ABSTRACT

A method for preventing the lateral rollover of motor vehicles, in which a transverse variable is ascertained that represents the lateral transverse dynamics of the motor vehicle and the transverse variable is compared to at least one threshold value and, depending on the comparison, a braking intervention is made to prevent the lateral rollover. An inclination variable is ascertained that represents the lateral inclination of the vehicle body and the threshold value is a function of the inclination variable.

11 Claims, 2 Drawing Sheets

(56) References Cited

U.S. PATENT DOCUMENTS

| | | | |
|---|---|---|---|
| 2006/0235575 A1* | 10/2006 | Brown et al. | 701/1 |
| 2007/0106442 A1* | 5/2007 | Lu | 701/38 |
| 2007/0276566 A1* | 11/2007 | Diebold et al. | 701/45 |
| 2008/0086248 A1* | 4/2008 | Lu et al. | 701/41 |
| 2008/0114509 A1* | 5/2008 | Inoue et al. | 701/38 |
| 2008/0133101 A1* | 6/2008 | Woywod et al. | 701/83 |
| 2009/0150021 A1* | 6/2009 | Le et al. | 701/29 |
| 2010/0161168 A1* | 6/2010 | Wu et al. | 701/29 |

FOREIGN PATENT DOCUMENTS

| | | |
|---|---|---|
| EP | 1 314 631 | 5/2003 |
| WO | WO 98/47733 | 10/1998 |

* cited by examiner

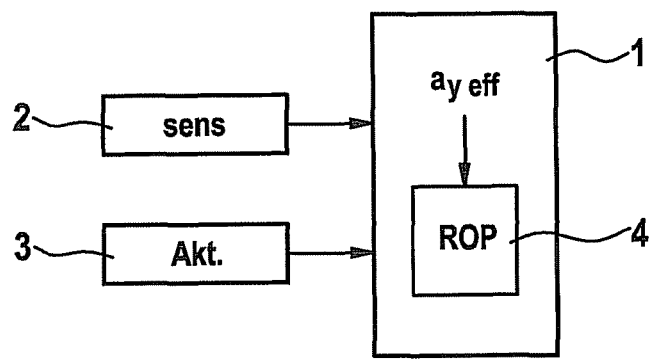
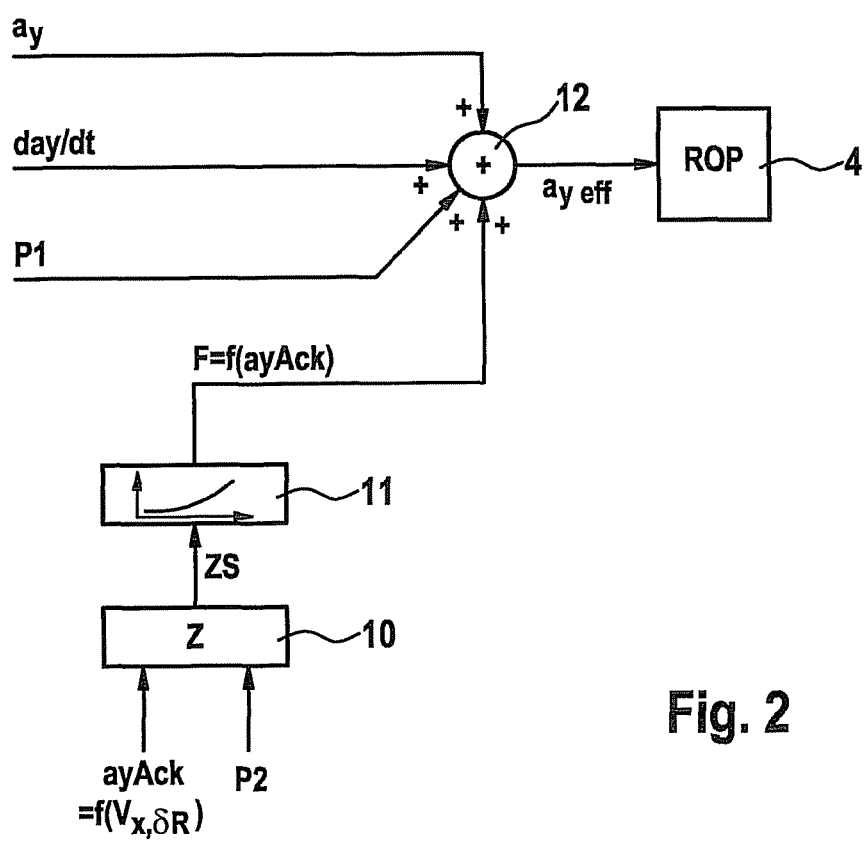

METHOD AND DEVICE FOR PREVENTING THE LATERAL ROLLOVER OF MOTOR VEHICLE

BACKGROUND INFORMATION

A method is described in German Patent No. DE 103 56 827 for rollover stabilization of a vehicle in a rollover-critical situation with respect to driving dynamics. A rollover-critical situation is detected by evaluating a control variable, and the stabilization intervention is activated or deactivated as a function of the control variable. The control intervention may also be kept up in driving situations having a relatively low transverse acceleration if the control variable or a characteristic property of the stabilizing algorithm is computed as a function of the steering angle and the vehicle speed.

SUMMARY OF THE INVENTION

The present invention relates to a method for preventing the lateral rollover of motor vehicles, in which
  a lateral variable is ascertained that represents the lateral transverse dynamics,
  the lateral variable is compared to at least one threshold value, and
  depending on the comparison, a braking intervention is made to prevent the lateral turnover.
  A core of the present invention is characterized in that
  an inclination variable is ascertained that represents the lateral inclination of the vehicle body, and
  the threshold value is a function of the inclination variable.

This makes it possible, even in the case of asymmetrically loaded vehicles, to perform a reliable turnover prevention without too early an execution of the regulating interventions. The lateral variable may be a quantity representing the instantaneous transverse dynamics, such as the transverse acceleration. A variable may also be involved that represents the transverse dynamics to be expected in the future, which is yielded, for instance, using an extrapolation or prediction. Because of that, the stabilization intervention may take place earlier or may not happen if, on the part of the driver, suitable stabilization measures have already been taken (e.g. via the steering angle).

One advantageous embodiment of the method is characterized by the inclination variable being ascertained using the offset value of a lateral acceleration sensor. This creates a simple possibility of ascertaining the inclination variable.

One advantageous embodiment of the present invention is characterized in that the offset value of the transverse acceleration sensor is ascertained using a long-term filtering of the output signal of the lateral acceleration sensor. An inclination of the lateral acceleration sensor takes place not only because of a vehicle inclination as a result of unsymmetrical loading, but obviously also because of the tolerance-encumbered installation into the motor vehicle. However, the inclination as a result of the tolerance-encumbered installation is clearly lower than the inclination as a result of unsymmetrical vehicle loading. Because of the long-term filtering, inclinations of the sensors as a result of road side inclinations are also identified.

One advantageous embodiment of the present invention is characterized in that the inclination variable is at least a function of whether the vehicle body is inclined towards the left or the right.

One advantageous refinement of the present invention is characterized in that
  in the case in which the vehicle travels a curve to the left and the vehicle body is inclined to the left, or the vehicle travels a curve to the right and the vehicle body is inclined to the right, the threshold value is increased, particularly as a function of the offset value, and, in particular, is increased by the offset value, and
  in the case in which the vehicle travels a curve to the left and the vehicle body is inclined to the right, or the vehicle travels a curve to the right and the vehicle body is inclined to the left, the threshold value is lowered, particularly lowered as a function of the offset value, and, in particular, is decreased by the offset value.

This takes into account that, in the first case, the vehicle is less in danger of rollover as compared to the symmetrically loaded vehicle, and that, in the second case, is more in danger of rollover compared to the symmetrically loaded vehicle.

One advantageous embodiment of the present invention is characterized in that the threshold value is increased by the offset value or that the threshold value is lowered by the offset value.

One advantageous embodiment is characterized in that only the outside wheel is braked because of the braking intervention.

One advantageous embodiment is characterized in that all the outside wheels are braked because of the braking intervention.

One advantageous embodiment is characterized in that both front wheels are braked because of the braking intervention.

The braking measures named above have proven to increase driving stability when there is danger of rollover.

Furthermore, the present invention includes a device including means designed for implementing the methods described above.

The advantageous refinements of the method according to the present invention manifest themselves also as advantageous embodiments of the device according to the present invention, and vice versa.

Rollover-critical vehicles frequently demonstrate an asymmetry of the vehicle center of gravity and the loading center of gravity with respect to the vehicle's longitudinal axis. The asymmetry may be brought about, for example, by the installation sites of vehicle devices, such as the fuel tank or batteries. However, the asymmetry is also frequently created by the asymmetrical application of a maximum payload as a result of spatial conditions of the loading space, or the fastening possibilities on or in the vehicle. One such example is vehicles for glaziers, having side-mounted glass pane holders. Because of the asymmetrical loading distribution, a lateral inclination of the vehicle body sets in as a result of different spring loads or shock-absorber loads on the left and right vehicle sides.

In regulating systems based on symmetrical load distribution, there is a conflict of aims between stability and implausible control. If one wishes to set the controller so sensitively that even rollover into the rollover-critical direction as a result of asymmetrical loading is surely avoided, the driver experiences the interventions, in the non-critical direction resulting from this, as too early and disturbing, perhaps even as faulty controls.

In order to remove these shortcomings, it is meaningful also to represent a loading asymmetry in the controller. In order to do this, however, sufficiently accurate information is required on the actual condition of the vehicle. Providing a fixed asymmetry in the controller is not effective since no data are present on the actual vehicle body, subsequent vehicle installations and conversions, as well as loading.

The inclination of the transverse acceleration sensor, caused by possible installation location tolerances, has the effect that, besides the actual transverse acceleration, a portion of the earth's acceleration is also being measured. Using a long-term comparison, this proportion, which makes itself observed as an offset value of the transverse acceleration signal, is ascertained over a certain distance traveled and is compensated for via an offset compensation.

In vehicles having symmetrical loading, because of the load-conditioned transverse inclination of the vehicle body, one obtains an additional inclination of the transverse acceleration sensor that is clearly greater than the inclination due to the installation tolerance. This transverse acceleration offset value ayeff caused by the inclination is used directly in the controller as an additive proportion for computing transverse acceleration-dependent triggering thresholds. An asymmetrical rollover tendency is thereby taken into account in the controller, and at all times an appropriate intervention time and an appropriate intervention level is ensured in both directions during cornering.

BRIEF DESCRIPTIONS OF THE DRAWINGS

FIG. 1 shows a schematic block diagram of a rollover stabilization system.

FIG. 2 shows a schematic representation of the formation of a control variable ayeff of a rollover stabilization algorithm.

DETAILED DESCRIPTION

Figure 3:
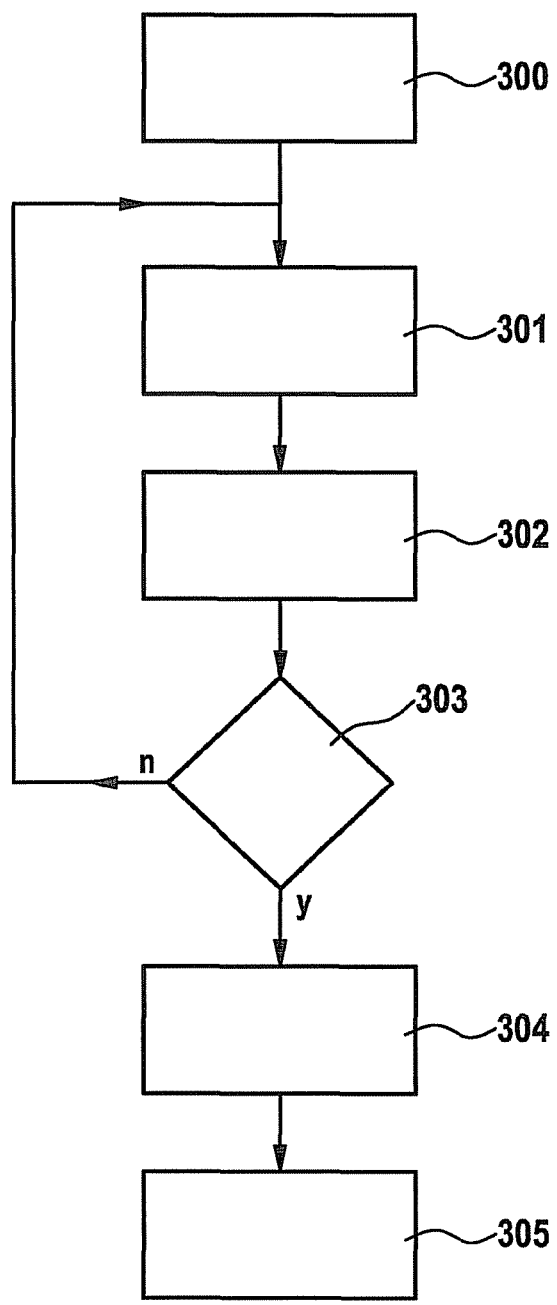
FIG. 3 shows the basic sequence of the method according to the present invention.

FIG. 1 shows a schematic representation of a rollover stabilization system having a control unit 1, in which a rollover stabilization algorithm 4 is stored, a sensor system 2 for detecting a critical driving state and an actuator 3 for carrying out a stabilization intervention. Sensor system 2 includes the usual sensors of a driving dynamics regulating system (ESP), such as wheel rotational speed sensors, a transverse acceleration sensor, a yaw rate sensor, a brake pressure sensor, a steering wheel angle sensor, etc, and is shown as a block 2, for simplicity's sake. As the actuator, one may use, for instance, a braking system of the vehicle, a steering system that is independent of the driver or even, for example, an active spring/shock absorber system.

In a rollover-critical driving situation, a rollover stabilization algorithm computes a corrective intervention by which the transverse acceleration of the vehicle is reduced, and thus the vehicle is prevented from rolling over. The corrective intervention takes place by operating the wheel brake on the outside front wheel, for example. This generates a yawing moment that counteracts the yawing motion of the vehicle, and thus stabilizes the vehicle. After satisfying a specified stabilization condition, the corrective intervention may be deactivated again. The activation or deactivation of the stabilization intervention may take place, for instance, as a function of a control variable ayeff, and ayeff, in turn, is a function of the transverse acceleration ay. Control variable ayeff is monitored with respect to exceeding a threshold value, in this context. If ayeff exceeds a specified switch-on threshold, a stabilization intervention is carried out. If ayeff then falls below a specified switch-off threshold, the stabilization intervention is terminated.

The manner in which the computation of control variable ayeff is yielded is shown in FIG. 2. FIG. 2 shows a schematic representation of the different variables that go into the computation of control variable ayeff. The different variables are summed up (summation node 12) in this example, and from this, control variable ayeff is formed.

In the present case, the control variable is a function of the transverse acceleration ay of the vehicle, of the change with time of the transverse acceleration day/dt as well as of one or more vehicle-specific parameters P, such as the self-steering gradient or the steering angle gradient, for example.

In addition, control variable ayeff is a function of an additional variable, designated here as variable F, which in turn is a function of steering angle $\delta_R$ and the vehicle's longitudinal speed $v_x$. Variable F may be computed, for example, by a suitable driving dynamics model. For this, the "single-track model" known from the literature is particularly useful, from which the so-called "Ackermann equation" is derived. Using the single-track model, a setpoint yaw speed $d\psi_{So}$ is computed, where $$d\Psi_{So}/dt = \frac{\delta_R}{1} \times \frac{v_x}{1+(v_x/v_{ch})^2}$$

Here $\delta_R$ is the steering angle at the front axle, l is the wheel base, $v_x$ is the vehicle's longitudinal speed and $v_{ch}$ is a characteristic speed.

From the single-track model, transverse acceleration ayAck may also be computed, where $$ayAck = d\psi_{So}/dt * v_x$$

Variable ayAck expresses that transverse acceleration which would come about based on the driver's command, namely of steering angle $\delta_R$, of the vehicle speed and the vehicle parameters at steady-state circular course driving, on the assumption of the validity of the linear single-track model.

Variable ayAck, normalized, if necessary, and limited to a specified value range, could, for example, go directly into the computation of control variable ayeff and be added to the remaining quantities at node 12. It is more advantageous, however, to supply virtual transverse acceleration ayAck to a buffer circuit or storage circuit 10, 11 which, in particular, at highly dynamic steering maneuvers (e.g. lane change maneuvers) in which neutral phases occur having low transverse acceleration and neutral steering wheel setting, and thus small values, does not "forget" the previous high values of ayAck. Without this storage circuit 10, 11, the stabilization intervention at small values of ayAck would be broken off at once, which is not meaningful when it comes to highly dynamic maneuvers.

In the exemplary embodiment shown, the buffer device or storage device includes a counter 10 implemented as software, to which virtual transverse acceleration ayAck as well as an additional vehicle-specific parameter P2 are supplied. The parameter may be, for instance, a self-steering gradient P2. If the two input variables ayAck, P2 exceed specified threshold values, counter 10 is set to a specified counter reading ZS. In a driving phase in which variable ayAck or parameter P fall below a specified switch-off threshold, the counter starts and counts backwards. Counter reading ZS is weighted using a characteristic line 11 and is newly dimensioned. The resulting value F goes jointly into the computation of control variable ayeff, and is added at node 12 to the remaining variables ay, day/dt and P. Characteristic line 11 is preferably a nonlinear characteristic line.

If the switch-on threshold is exceeded again based on the steering behavior of the driver, counter 10 is set again. The value of control variable ayeff changes only slightly in this case, and stabilizing regulation 4 is maintained. As long as the switch-on threshold is not exceeded any more, counter 10 continues to count backwards, variable F being reduced corresponding to the counter reading (weighted by characteristic line 11). When value F, and, with that, control variable ayeff falls below a specified threshold value, stabilization regulation 4 is broken off.

It is thus possible, using buffer device 10, 11 that was described, to maintain the stabilization intervention even during short-term neutral driving states in highly dynamic maneuvers.

The basic sequence of the method according to the present invention is shown in FIG. 3. After the start of the method in block 300, a transverse variable is ascertained in block 301, representing the lateral transverse dynamics of the motor vehicle, and subsequently to that, in block 302 an inclination variable is ascertained representing the lateral inclination of the vehicle. After that, it is checked in block 303 whether the transverse variable is exceeding a threshold value, the threshold value being a function of the inclination variable. If the answer is "no" (indicated as "n" in FIG. 3), then the system branches back to the input of block 301. On the other hand, if the answer is "yes" (characterized in FIG. 3 as "y"), then subsequently in block 304 a braking intervention is carried out to prevent the rollover of the motor vehicle. The method ends in block 305.

The invention claimed is:

1. A method for preventing a lateral rollover of a motor vehicle, comprising:
    ascertaining, by a computer processor, a transverse variable that represents lateral transverse dynamics of the motor vehicle;
    comparing, by the computer processor, the transverse variable to at least one threshold value;
    a brake control module making a braking intervention to prevent the lateral rollover, depending on the comparison; and
    ascertaining, by the computer processor, an inclination variable that represents a lateral inclination of a vehicle body, wherein the threshold value is a function of the inclination variable.

2. The method according to claim 1, wherein the inclination variable is ascertained using an offset value of a transverse acceleration sensor.

3. The method according to claim 2, wherein the offset value of the transverse acceleration sensor is ascertained using a long-term filtering of an output signal of the transverse acceleration sensor.

4. The method according to claim 2, wherein the inclination variable is at least a function of whether the vehicle body is inclined towards the left or the right.

5. The method according to claim 4, wherein:
    in the case where the vehicle is traveling a curve to the left and the vehicle body is inclined to the left, or the vehicle is traveling a curve to the right and the vehicle body is inclined to the right, the threshold value is increased, and
    in the case where the vehicle is traveling a curve to the left and the vehicle body is inclined to the right, or the vehicle is traveling a curve to the right and the vehicle body is inclined to the left, the threshold value is decreased.

6. The method according to claim 1, wherein the threshold value is increased by an offset value or the threshold value is decreased by an offset value.

7. The method according to claim 1, wherein only an outside front wheel is braked by the braking intervention.

8. The method according to claim 1, wherein only all outside wheels are braked by the braking intervention.

9. The method according to claim 1, wherein only two front wheels are braked by the braking intervention.

10. A device for preventing a lateral rollover of a motor vehicle, comprising:
    a computer processor configured to:
        ascertain a transverse variable that represents lateral transverse dynamics of the motor vehicle;
        ascertain an inclination variable that represents a lateral inclination of a vehicle body;
        compare the transverse variable to at least one threshold value, wherein the threshold value is a function of the inclination variable; and
        conduct a braking intervention to prevent the lateral rollover, depending on the comparison.

11. A method for preventing a lateral rollover of a motor vehicle, comprising:
    ascertaining, by a computer processor, an inclination variable quantifying an inclination of a body of the motor vehicle;
    ascertaining, by a computer processor, a transverse variable representing forces acting on the motor vehicle;
    comparing, by the computer processor, the transverse variable to at least one threshold value obtained as a function of the inclination variable; and
    a brake control module making a braking intervention to prevent the lateral rollover, depending on the comparison.

* * * * *